United States Patent
Depauw

(10) Patent No.: US 6,797,389 B1
(45) Date of Patent: Sep. 28, 2004

(54) GLAZING

(75) Inventor: Jean-Michel Depauw, Jurnet (BE)

(73) Assignee: Glaverbel, Brussels (BE)

( * ) Notice: Subject to any disclaimer, the term of this patent is extended or adjusted under 35 U.S.C. 154(b) by 219 days.

(21) Appl. No.: 10/110,461

(22) PCT Filed: Oct. 13, 2000

(86) PCT No.: PCT/EP00/10278

§ 371 (c)(1), (2), (4) Date: May 24, 2002

(87) PCT Pub. No.: WO01/27050

PCT Pub. Date: Apr. 19, 2001

(30) Foreign Application Priority Data

Oct. 14, 1999 (EP) .............................................. 99203357

(51) Int. Cl.[7] .............................................. B32B 17/06
(52) U.S. Cl. ....................... 428/432; 428/469; 428/472; 428/699; 428/701; 428/702; 427/163.1; 427/165
(58) Field of Search ................................ 428/615, 655, 428/660, 673, 426, 432, 457, 469, 472, 688, 689, 697, 699, 701, 702

(56) References Cited

U.S. PATENT DOCUMENTS

| | | |
|---|---|---|
| 4,610,771 A | 9/1986 | Gillery |
| 5,279,722 A | 1/1994 | Szczyrbowski et al. .................... 204/192.27 |
| 5,821,001 A | 10/1998 | Arbab et al. |
| 5,834,103 A | 11/1998 | Bond et al. ................. 428/216 |
| 5,942,338 A | 8/1999 | Arbab et al. |
| 2003/0012963 A1 * | 1/2003 | Ebisawa et al. ............ 428/432 |

FOREIGN PATENT DOCUMENTS

| | | |
|---|---|---|
| EP | 0719876 | 7/1996 |
| EP | 0 803 481 A2 | 10/1997 |
| EP | 0747330 | 10/1999 |
| GB | 2229737 | 5/1992 |
| WO | WO 99/58736 | 11/1999 |
| WO | WO00/37380 | 12/1999 |
| WO | WO00/37381 | 12/1999 |

* cited by examiner

Primary Examiner—Deoborah Jones
Assistant Examiner—Andrew T Piziali
(74) Attorney, Agent, or Firm—Piper Rudnick, LLP; Jerold I. Schneider

(57) ABSTRACT

A glazing panel comprises in sequence at least: a glass substrate, a base antireflective layer comprising at least a base antireflective lower layer and a base antireflective upper layer which is of a different composition to that of the base antireflective lower layer, the base antireflective upper layer comprising a mixed oxide of Zn and at least one additional material X, in which the ratio X/Zn in the base antireflective upperlayer is between 0.02 and 0.5 by weight and in which X is one or more of the materials selected from the group comprising Sn, Al, Ga, In, Zr, Sb, Bi, Mg, Nb, Ta and Ti, a first infra-red reflecting layer, a first barrier layer, a central antireflective layer comprising at least a central antireflective lower layer and a central antireflective upper layer which is of a different composition to that of the central antireflective lower layer, the central antireflective lower layer being in direct contact with the first barrier layer and the central antireflective upper layer comprising a mixed oxide of Zn and at least one additional material Y, in which the ratio Y/Zn in the base antireflective upper layer is between 0.02 and 0.5 by weight and in which Y is one or more of the materials selected from the group comprising Sn, Al, Ga, In, Zr, Sb, Bi, Mg, Nb, Ta and Ti, a second infra-red reflecting layer, a second barrier layer, a top antireflective layer. The coating stack of such a glazing panel may provide particularly advantageous levels of the thermal stability so as to facilitate heat treatment of the glazing panel.

12 Claims, 1 Drawing Sheet

GLAZING

CROSS-REFERENCE TO RELATED APPLICATIONS

This application is the entry into the U.S. National Stage of PCT Application No. PCT/EP00/10278 filed Oct. 13, 2000, and claims priority from European Application No. 99203357.1 filed Oct. 14, 1999, the disclosures of both of which are hereby incorporated by reference.

BACKGROUND OF THE INVENTION

This invention relates to glazing panels and particularly to glazing panels which are intended to undergo heat treatment following application of a solar control filter.

EP 233003A describes a glazing panel carrying a sputter coated optical filter having the structure: glass substrate/ $SnO_2$ base dielectric/first metallic barrier of Al, Ti, Zn, Zr or Ta/Ag/second metallic barrier of Al, Ti, Zn, Zr or Ta/$SnO_2$ top dielectric. The optical filter is designed to block a significant portion of the incident radiation in the infra red portion of the spectrum whilst allowing passage of a significant portion of the incident radiation in the visible portion of the spectrum. In this way, the filter acts to reduce the heating effect of incident sunlight whilst allowing good visibility through the glazing and is particularly suitable for car windscreens.

In this type of structure, the Ag layer acts to reflect incident infra red radiation; in order to fulfil this role must be maintained as silver metal rather than silver oxide and must not be significantly contaminated by adjacent layers. The dielectric layers which sandwich the Ag layer serve to reduce the reflection of the visible portion of the spectrum which the Ag layer would otherwise provoke. The second barrier serves to prevent oxidation of the Ag layer during sputtering of the overlying $SnO_2$ dielectric layer in an oxidising atmosphere; this barrier is at least partially oxidised during this process. The main role of the fast barrier is to prevent oxidation of the silver layer during heat treatment of the coating (e.g. during bending and/or tempering) of the glazing panel by being oxidised itself rather than allowing passage of oxygen to the Ag layer. This oxidation of the barrier during heat treatment provokes an increase in TL of the glazing panel.

EP 792847A discloses a heat treatable solar control glazing panel which is based on the same principle and has the structure: glass substrate/ZnO dielectric/Zn barrier/Ag/Zn barrier/ZnO dielectric/Zn barrier/Ag/Zn barrier/ZnO dielectric. The Zn barriers positioned below each of the Ag layers are intended to be oxidised completely during heat treatment and serve to protect the Ag layers from oxidation. As well known in the art, the structure of having two, spaced Ag layers rather than a single Ag layer increases the selectivity of the filter.

EP 275474 A discloses a heat treatable solar control panel having the structure: glass substrate/zinc stannate dielectric/ Ti barrier/Ag/Ti barrier/zinc stannate dielectric. Ti barriers are generally favoured in this type of heat treatable structure due to their high affinity for oxygen and relative ease with which they can be oxidised to form titanium oxide.

SUMMARY OF THE INVENTION

According to one aspect, the present invention provides a glazing panel as defined in claim 1.

The coating layers are preferably deposited by sputtering, preferably magnetron sputtering but other deposition techniques may be used. Different layers of the coating stack may be deposited using different techniques.

The upper layers in the base and central antireflective layers may have the same or substantially the same composition. This may facilitate the use of substantially similar targets to deposit these layers and/or substantially similar deposition conditions.

The combination of the defined upper layers in the base and central antireflective layers as part of the defined coating stack may facilitate the production of glazing panels (and particularly of laminated windscreens) having TL greater than 75% once subjected to heat treatment whilst still providing an advantageous combination of repeatable thermal stability during heat. treatment, low haze, mechanical and chemical resistance and desired colour in reflection and/or transmission.

One or preferably both of the additional materials X and Y is preferably Sn and/or Al. This may give a particularly advantageous combination of properties.

The proportion of Zn in the mixed oxide that forms the base antireflective upper layer and/or that which forms the central antireflective upper layer may be such that ratio X/Zn and/or the ratio Y/Zn is between about 0.03 and 0.3 by weight.

Arranging one or each of the upper layers of the base and/or central antireflective layers in direct contact with its overlying infra-red reflecting layer may also facilitate achieving high levels of TL during heat treatment. Alternatively, an addition layer, for example, a barrier layer, may be interposed between one or each of the upper layers of the base and central antireflective layers and its overlying infra red reflecting layer. Such an additional barrier may be a layer comprising Ti and/or comprising an oxide of Ti. The additional barrier layer may have a geometrical thickness of between about 5 Å and 60 Å.

The base antireflective upper layer and/or the central antireflective upper layer may have a geometrical thickness of less than about 200 Å, less than about 150 Å, less than about 130 Å or less than about 110 Å. This may provide advantageous mechanical properties to the coating stack, particularly with respect to resistance to peel tests.

The base antireflective upper layer and/or the central antireflective upper layer may have a geometrical thickness of greater than about 30 Å, greater than about 50 Å greater than about 100 Å. This may provide a sufficient thickness to enhance the properties of the coating stack, particularly with respect to TL obtainable after heat treatment.

The central antireflective lower layer may comprises at least one layer which provides a sufficient block to the migration of oxygen and/or sodium and/or other materials to prevent significant contamination of and/or diffusion of the layers of the coating stack. Preferably, the central antireflective lower layer is in direct contact with the first barrier layer and comprises a material which resists diffusion of the first barrier layer during heat treatment. The combination of a central antireflective lower layer as defined in claim 5 with a first barrier which is deposited at least partially in metallic or substantially metallic form and subsequently oxidised during heat treatment (and particularly a barrier that comprises or consists essentially of metallic Ti when deposited) may permit particularly high thermal stability of the coating stack during heat treatment. It is believed that diffusion of material from the first barrier layer into the central antireflective lower layer during heat treatment and particularly during severe heat treatment may, in some coating stack arrangements be a critical factor in determining thermal stability of the coating stack; the composition of central antireflective lower layer defined in claim 5 may significantly mitigate against such diffusion.

The base antireflective lower layer may comprise at least one layer which provides a sufficient block to the migration of oxygen and/or sodium and/or other materials to prevent significant contamination of and/or diffusion of the layers of the coating stack. The use of a base antireflective lower layer as defined in claim 6 may be used to facilitate this whilst, in addition, facilitating the arrangement and control of the deposition conditions.

The use of a top antireflective layer as defined in claim 9 may facilitate the arrangement and control of the deposition conditions for the overall coating stack. In addition, this layer may be arranged to provide a block to migration of oxygen during heat treatment and/or diffusion of the second barrier layer.

The top antireflective layer may comprise at least one layer which comprises a mixed oxide of Zn and at least one additional material W, in which the ratio W/Zn in that layer is between 0.02 and 0.5 by weight and in which W is one or more of the materials selected from the group comprising Sn, Al, Ga, In, Zr, Sb, Bi, Mg, Nb, Ta and Ti. This may improve the thermal stability of the coating stack during heat treatment and/or its mechanical or chemical resistance, particularly when used as defined in claim 10.

According to further aspects, the invention provides a glazing panel as defined in claim 13 and for use of a glazing panel as defined in claim 14.

According to another aspect, the invention provides a method as defined in claim 15.

The invention may provide an advantageous combination of properties for the glazing, for example:

particularly good levels of TL following heat treatment particularly good thermal stability during heating of the glazing panel, for example during tempering and/or bending. This may facilitate bending of coated glazing panels, particularly to produce complex shapes, without provoking unacceptable variations in colour over the surface of the glazing panel. Colour variations during heat treatment may be caused by lack of thermal stability of the coating stack when subjected to conditions necessary to bend and/or temper the glass substrate. This aspect may be particularly enhanced by the use of a central antireflective lower layer as defined in claim 5 to inhibit significant diffusion of the first barrier layer;

ease and controllability of deposition: the antireflective layers according to the present invention may be deposited more easily and with more control than, for example, Al2O3 or SiO2. Whilst Al2O3 and SiO2 show a good degree of thermal stability they are difficult to deposit using common sputtering techniques.

good mechanical resistance: the antireflective layers according to the present invention may be used without prejudicing the mechanical resistance of the coating. In particular, they may perform well in pummel tests when the glazing panel is used in a laminated structure.

compatibility with Ag: crystallisation of the Ag layer affects its optical properties. A pure ZnO layer adjacent the Ag can lead to excessive crystallisation of the Ag and to problems of haze in the coating, particularly during heat treatment. However, where an antireflective layer does not consist of ZnO there may be insufficient recrystallisation of the Ag layers resulting in a level of infra red reflection and a level of electrical conductivity in the coating which are below the optimum obtainable. The present invention may be used to favour crystallisation to a sufficient degree to provide good infra red reflecting properties whilst avoiding excessive haze. In particular, it may provide a favourable crystallisation compared with an antireflective layer composed of TiO2 or SnO2. One possible explanation for this may be that the presence of the additional material X or Y in the zinc oxide structure may reduce the crystal grain growth in the mixed oxide layer, especially perpendicular to the substrate. This may result in a less crystalline, more amorphous structure which reduces diffusion that might otherwise be likely to occur at crystal grain boundaries.

production cycle time: an oxide layer which is a mixture of Zn and at least one of the specified addition materials may have a higher refractive index than antireflective layers of, for example, ZnO and SnO2, which are commonly used in similar structures and yet will be quicker to deposit than known antireflective layers having relatively high refractive indexes, for example, TiO2. Consequently, this may enable the production cycle time to be improved.

good selectivity: the higher refractive Index may, in addition, facilitate an increase in the selectivity of the coating stack.

low emissivity, notably an emissivity of less than 0.35, preferably less than 0.32 or less than 0.30, particularly after heat treatment low electrical resistance, notably a resistance per square of less than 3 ohms per square, preferably less than 2.8, 2.5 or 2.3 ohms per square, particularly after heat treatment Particularly advantageous properties may be obtained if additional material X or Y consists essentially of Sn of Sn with one or more additional materials from the specified group of materials, for example, Ti and Al essentially of Al of Al with one or more additional materials from the specified group of materials.

The present invention may be particularly advantageous in facilitating manufacture of laminated windscreens or other glazings having colour co-ordinates on the CIElab scale of $L^*=40\pm2.5$ $a^*=-6\pm2.5$ $b^*=-2\pm2.5$. Whilst known coating stacks may enable such windscreens to be manufactured, particularly for simple models which do not require severe heating conditions to provide desired configurations once bent, the present invention, by providing a coating stack which is particularly stable during heat treatment of the glazing panel may allow more complex bent forms to be produced, and/or may provide significantly better industrial yield with less rejects and/or may enable the use of less sophisticated bending methods and/or may ensure that such characteristics may be consistently obtained for industrially produced glazings whilst still providing a TL of at least 75%, and indeed a TL which may be of or above 76%.

Similarly, the present invention may facilitate manufacture of laminated windscreens or other glazings in which the variation of colour $\Delta E^*$ over the surface of the glazing is less than 2, preferably less than 1.5 or 1.2 and more preferably less than 1 where the variation of colour $\Delta E^*$ is calculated as:

$\Delta E^*=\sqrt{(L^{*2}+a^{*2}+b^{*2})}$ where $L^*$ $a^*$ and $b^*$ are measured on the CIElab scale.

The variation in colour over the surface of a windscreen will depend on the complexity of the windscreen, the heating method and conditions used to bend the glazing panel and the thermal stability of the coating stack to such colour variations. Whilst prior known coating stacks may enable such low levels of colour variation to be achieved particularly for simple windscreens or under certain heating conditions or with certain levels of rejection for non-conformity, the present invention may be used to facilitate industrial manufacture of such windscreens under significantly more advantageous industrial conditions.

The term "heat treatable glazing panel" as used herein means that the glazing panel carrying the coating stack is adapted to undergo a bending and/or thermal tempering and/or thermal hardening operation without the haze of the so treated glazing panel exceeding 0.5, and preferably without the haze exceeding 0.3. The term "substantially haze free heat treated glazing panel" as used herein means a glazing panel which has been bent and/or thermally tempered and/or thermally hardened and has a haze that does not exceed 0.5 and which preferably does not exceed 0.3. The invention may be particularly advantageous in facilitating manufacture in which a coating stack is deposited on a substantially flat or planar glass substrate to produce a glazing panel which may be subsequently heat treated, for example bent or tempered.

The filter stack may comprise one or more barrier layers underlying and/or overlying the infra red reflecting layer, as is known in the art. Barriers of, for example, one or more of the following material may be used: Ti, Zn, Cr, "stainless steel", Zr, Ni, NiCr, ZnTi NiTi and ZnAl. Such barriers may be deposited, for example, as metallic layers or as sub-oxides (i.e. partially oxidised layers). Alternatively, nitrided barrier layers may also be used. The barrier layers in such coating stacks may serve to protect the infra red reflecting layers from unacceptable levels of degradation during the deposition of overlying layers and/or during heat treatment of the coating stack.

One or more of such barrier layers may comprise the same materials as the mixed oxide layer, particularly the adjacent mixed oxide layer. This may facilitate management of targets and control of deposition conditions and in the latter case may provide good adhesion between the layers and thus good mechanical durability of the coating stack.

Heat treatment may provoke an increase in the TL of the glazing panel. Such an increase in TL may be advantageous in ensuring that TL is sufficiently high for the glazing panel to be used in a vehicle windscreen. TL may increase in absolute terms during heat treatment by, for example, greater than about 2.5%, greater than about 3%, greater than about 5%, greater than about 8% or greater than about 10%.

BRIEF DESCRIPTION OF THE FIGURE

An example of the present invention will now be described with reference to FIG. 1 which is a cross-section through a glazing panel prior to a bending and tempering operation (for ease of representation, the relative thicknesses of the glazing panel and coating layers are not shown to scale).

DETAILED DESCRIPTION

EXAMPLE 1

Figure 1:
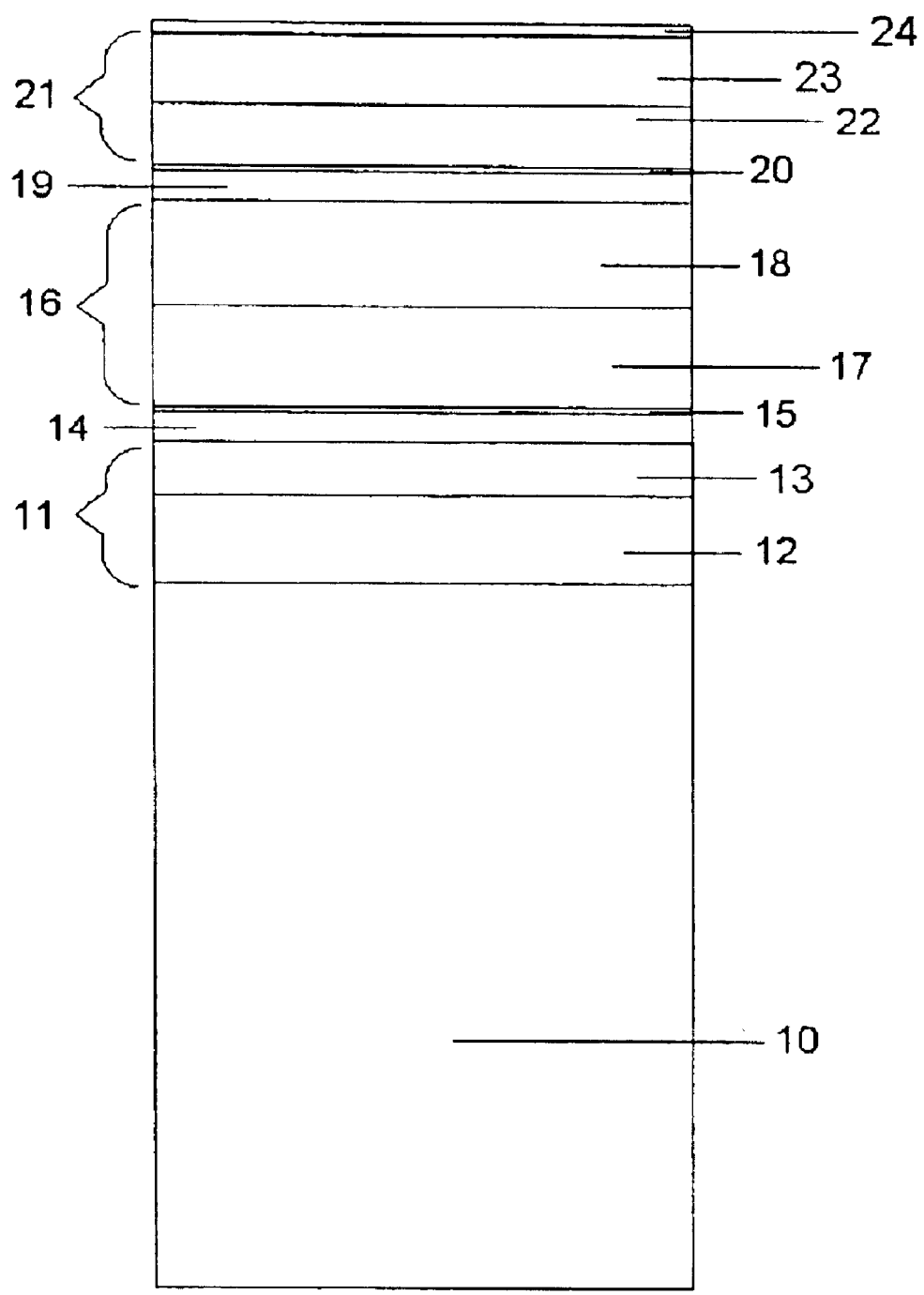

FIG. 1 shows a double Ag layer, heat treatable, coating layer deposited on a substantially flat or planar glass substrate by magnetron sputtering and having the following sequential structure:

| | Reference number | Geometrical thickness | ratio of Sn/Zn by weight |
|---|---|---|---|
| Glass substrate | 10 | 2 mm | |
| Base antireflective layer comprising: | 11 | | |
| lower layer of ZnSnOx | 12 | 200 Å | 0.7 |
| upper layer of ZnSnOx | 13 | 100 Å | 0.17 |
| Ag | 14 | 100 Å | |
| Ti overlying barrier | 15 | 40 Å | |
| Central antireflective layer comprising | 16 | | |
| central lower layer of ZnSnOx | 17 | 650 Å | 0.7 |
| upper layer of ZnSnOx | 18 | 100 Å | 0.17 |
| Ag | 19 | 100 Å | |
| Ti overlying barrier | 20 | 40 Å | |
| Top antireflective layer comprising: | 21 | | |
| lower layer of ZnSnOx | 22 | 80 Å | 0.17 |
| upper layer of ZnSnOx | 23 | 140 Å | 0.7 |
| protective overcoat of Ti | 24 | 30 Å | | in which ZnSnOx is a mixed oxide containing Zn and Sn deposited in this example by reactively sputtering a target which is an alloy or mixture of Zn and Sn in the presence of oxygen.

Alternatively, a mixed oxide layer may be formed by sputtering a target which is a mixture of zinc oxide and an oxide of an additional material particularly in an argon gas or argon rich oxygen containing atmosphere.

The Ti barriers are deposited by sputtering a Ti target which is in an argon rich oxygen containing atmosphere to deposit a barrier that is not fully oxidised.

The oxidation state in each of the base, central and top ZnSnOx dielectric layers need not necessarily be the same. Similarly, the oxidation state in each of the Ti barriers need not be the same.

Each overlying barrier protects its underlying silver layer from oxidation during sputter deposition of its overlying ZnSnOx oxide layer. Whilst further oxidation of these barriers layers may occur during deposition of their overlying oxide layers a portion of these barriers preferably remains in metallic form or in the form of an oxide that is not fully oxidised to provide a barrier for and during subsequent heat treatment of the glazing panel.

This particular glazing panel is intended for incorporation in a laminated vehicle windscreen and displays the following properties:

| Property | Prior to heat treatment[see Note 1 below] | Following heat treatment[see Note 2 below] |
|---|---|---|
| TL(Illuminant A) | 63% | 76% |
| TE (System Moon 2) | 38% | 42% |
| haze | 0.1 | 0.25 |
| a* | −10 (glass side) | −6 (external) |
| b* | +10 (glass side) | −3 (external) |
| RE (System Moon 2) | 29% (glass side) | 32% (external) |

Note [1] Measured for monolithic glazing panel with coating prior to heat treatment
Note [2] Measured following heat treatment at 650° C. for 10 minutes followed by bending and tempering, and lamination with clear 2 mm glass sheet and 0.76 mm clear pvb Heat treatment preferably causes substantially complete oxidation of all of the barrier layers and of the protective overcoat.

The colour co-ordinates of the example are particularly suited to car windscreens as they give a neutral or slightly blue or slightly green appearance in reflection when the windscreen is mounted at an angle in the car body. For other applications, for example architectural applications, the colour in reflection may be adjusted as is known in the art by adjusting the thicknesses of the dielectric layers and/or the infra red reflecting layer(s).

Additional layers may be introduced above, below or between the film stacking arrangement if desired without departing from the invention.

In addition to the advantageous optical properties that may be obtained, the example provides a coating layer which may be electrically heated, for example, in an electrically heated car windscreen to provide a de-misting and/or de-frosting function with the addition of suitably placed electrical connectors.

The TL of the glazing panel may be adjusted to suit the desired application. For example

- if the glazing panel is to be used as a windscreen for the European market, TL may be selected to be greater than 75% (as required by European regulations).
- if the glazing panel is to be used as a windscreen for the US market, TL may be selected to be greater than 70% (as required by US regulations).
- if the glazing panel is to be used as a vehicle front sidelight, TL may be adjusted to be greater than 70% (as required by European regulations).
- if the glazing panel is to be used as a vehicle rear sidelight or a rear window for a vehicle, TL may be selected to be between about 30% and 70%.

Such adjustment of TL may be achieved, for example,

- by adapting the thicknesses of the layers of the coating stack, in particular the thicknesses of the dielectric layers and/or the infra-red reflecting layer(s).
- by combining the coating stack with a tinted glass substrate, for example, in order to increase the selectivity.
- by combining the coating stack with a tinted pvb or other laminating layer.

One possible method for determining the composition of the coating stack is by using a SIMS technique. This technique is based upon ionic bombardment of the coating stack with analyses, particularly mass analysis, of the material ejected from the coating stack. Such an analysis may be used to provide an indication of the composition and thickness of the layers of a coating stack.

Glossary

Unless otherwise indicated by the context, the terms listed below have the following meanings in this specification:

| | | |
|---|---|---|
| a* | | colour co-ordinate measured on the CIELab scale at normal incidence |
| Ag | silver | |
| Al | aluminium | |
| Al2O3 | aluminium oxide | |
| b* | | colour co-ordinate measured on the CIELab scale at normal incidence |
| Bi | bismuth | |
| Cr | chromium | |
| Ga | gallium | |
| emissivity | | emissivity of a given surface at a given temperature is defined as the ratio of the energy emitted by the surface to that of a perfect emitter (black body emissivity = 1.0) at the same temperature. For the glazings in question, emissivity is often measured at 25° C. on the coated side of a substrate. |
| haze | | the percentage of transmitted light which in passing through the specimen deviates from the incident beam by forward scattering, as measured in accordance with the ASTM Designation D 1003-61 (Reapproved 1988). |
| In | indium | |
| infra red reflecting material | | a material that has a reflectance higher than the reflectance of sodalime glass in the band of wavelengths between 780 nm and 50 microns |
| Mg | magnesium | |
| Na | sodium | |
| Nb | niobium | |
| Ni | nickel | |
| RE | energetic reflection | the solar flux (luminous and non-luminous) reflected from a substrate as a percentage of the incident solar flux |
| Sb | antimony | |
| selectivity | | the ratio of the luminous transmittance to the solar factor i.e. TL/TE |
| SiO2 | silicon oxide | |
| SnO2 | tin oxide | |
| Ta | tantalum | |
| TE | energetic transmittance | the solar flux (luminous and non-luminous) transmitted through a substrate as a percentage of the incident solar flux |
| Ti | titanium | |
| TL | luminous transmittance | the luminous flux transmitted through a substrate as a percentage of the incident luminous flux |
| Zn | zinc | |
| ZnO | Zinc oxide | |
| Zr | Zirconium | |

As will be understood by those skilled in the art, the combination of the antireflective layers in the coating stack serves to reduce the total reflection of the coating stack in the visible portion of the spectrum; the composition and thickness of each antireflective layer may be selected accordingly.

What is claimed is:

1. A glazing panel comprising in sequence at least:

a glass substrate;

a base antireflective layer comprising at least a base antireflective lower layer and a base antireflective upper layer which is of a different composition to that of the base antireflective lower layer, the base antireflective upper layer comprising a mixed oxide of Zn and at least one additional material X, in which the ratio X/Zn in the base antireflective upper layer is between 0.02 and 0.5 by weight and in which X is one or more of the materials selected from the group consisting of Sn, Al, Ga, In, Zr, Sb, Bi, Mg, Nb, Ta and Ti;

a first infra-red reflecting layer;

a first barrier layer;

a central antireflective layer comprising at least a central antireflective lower layer and a central antireflective upper layer which is of a different composition to that of the central antireflective lower layer, the central antireflective lower layer being in direct contact with the first barrier layer and the central antireflective upper layer comprising a mixed oxide of Zn and at least one additional material Y, in which the ratio Y/Zn in the central antireflective upper layer is between 0.02 and 0.5 by weight and in which Y is one or more of the materials selected from the group consisting of Sn, Al, Ga, In, Zr, Sb, Bi, Mg, Nb, Ta and Ti;

a second infra-red reflecting layer;

a second barrier layer; and a top antireflective layer.

2. A glazing panel in accordance with claim 1, and further including at least one of the following features (A) through (K):

(A) the base antireflective upper layer is in direct contact with the first infra-red reflecting layer;

(B) the central antireflective upper layer is in direct contact with the second infra-red reflecting layer;

(C) the upper layer of the base antireflective layer has a geometrical thickness within the range of about 30 Å to 200 Å;

(D) the upper layer of the central antireflective layer has a geometrical thickness within the range of about 30 Å to 200 Å;

(E) the central antireflective lower layer comprises a mixed oxide of Zn and at least one additional material W, in which the ratio W/Zn in the central antireflective lower layer is between 0.5 and 2 by weight and in which W is one or more of the materials selected from the group consisting of Sn, Al, Ga, In, Zr, Sb, Bi, Mg, Nb, Ta and Ti;

(F) the base antireflective lower layer comprises a mixed oxide of Zn and at least one additional material W, in which the ratio W/Zn in the base antireflective lower layer is between 0.5 and 2 by weight and in which W is one or more of the materials selected from the group consisting of Sn, Al, Ga, In, Zr, Sb, Bi, Mg, Nb, Ta and Ti;

(G) the first barrier layer comprises titanium;

(H) the second barrier layer comprises titanium;

(I) the top antireflective layer comprises at least one layer which comprises a mixed oxide of Zn and at least one additional material W, in which the ratio W/Zn in that layer is between 0.02 and 0.5 by weight and in which W is one or more of the materials selected from the group consisting of Sn, Al, Ga, In, Zr, Sb, Bi, Mg, Nb, Ta and Ti and which is in direct contact with the second barrier layer;

(J) the glazing panel is a heat treatable glazing panel;

(K) the glazing panel is a substantially haze free treated glazing panel.

3. A glazing panel in accordance with claim 2, and further including at least two of the features (A) through (K).

4. A glazing panel in accordance with claim 2, and further including at least three of the features (A) through (K).

5. A glazing panel in accordance with claim 2, and further including at least four of the features (A) through (K).

6. A glazing panel in accordance with claim 2, and further including at least five of the features (A) through (K).

7. A glazing panel in accordance with claim 2, and further including at least six of the features (A) through (K).

8. A glazing panel in accordance with claim 2, and further including all of the features (A) through (K).

9. A glazing panel comprising:

a glass substrate onto which a coating stack has been deposited, in which the coating stack consists essentially of the following sequential layers:

a base antireflective layer comprising a base antireflective lower layer and a base antireflective upper layer which is of a different composition to that of the base antireflective lower layer;

the base antireflective lower layer comprising a mixed oxide of Zn and Sn having a ratio Sn/Zn ranging from 0.5 to 2 by weight;

the base antireflective upper layer comprising a mixed oxide of Zn and Sn having a ratio Sn/Zn ranging from 0.02 to 0.5 by weight;

a first infra-red reflecting layer comprising metallic silver;

a first barrier layer;

a central antireflective layer comprising a central antireflective lower layer and a central antireflective upper layer which is of a different composition to that of the central antireflective lower layer, said central antireflective lower layer being in direct contact with the first barrier layer and comprising a mixed oxide of Zn and Sn having a ratio Sn/Zn ranging from 0.5 to 2;

the central antireflective upper layer comprising a mixed oxide of Zn and Sn having a ratio Sn/Zn ranging from 0.02 to 0.5 by weight;

a second infra-red reflecting layer comprising metallic silver;

a second barrier layer; and a top antireflective layer.

10. Use of a glazing panel in accordance with claim 9 in the manufacturing of a laminated glazing panel in which the glazing panel in accordance with claim 24 is heated and bent into its desired shape subsequent to deposition of the coating stack.

11. A method of manufacturing a glazing panel having a haze of less than about 0.5 comprising the step of subjecting a glazing panel in accordance with claim 9 to a tempering and/or bending operation at a temperature at least 570° C.

12. A method of manufacturing a glazing panel having a haze of less than about 0.5 comprising the step of subjecting a glazing panel in accordance with claim 9 to a tempering and/or bending operation at a temperatutre at least 570° C.

* * * * *